Oct. 11, 1966  O. F. GRAHAM  3,277,789
INDEX TABLE AND INDEXING CONTROL THEREFOR
Filed March 29, 1965  2 Sheets-Sheet 1

INVENTOR
ORIN F. GRAHAM
By Joseph A. Semigran
ATTORNEY

Oct. 11, 1966  O. F. GRAHAM  3,277,789
INDEX TABLE AND INDEXING CONTROL THEREFOR
Filed March 29, 1965  2 Sheets-Sheet 2
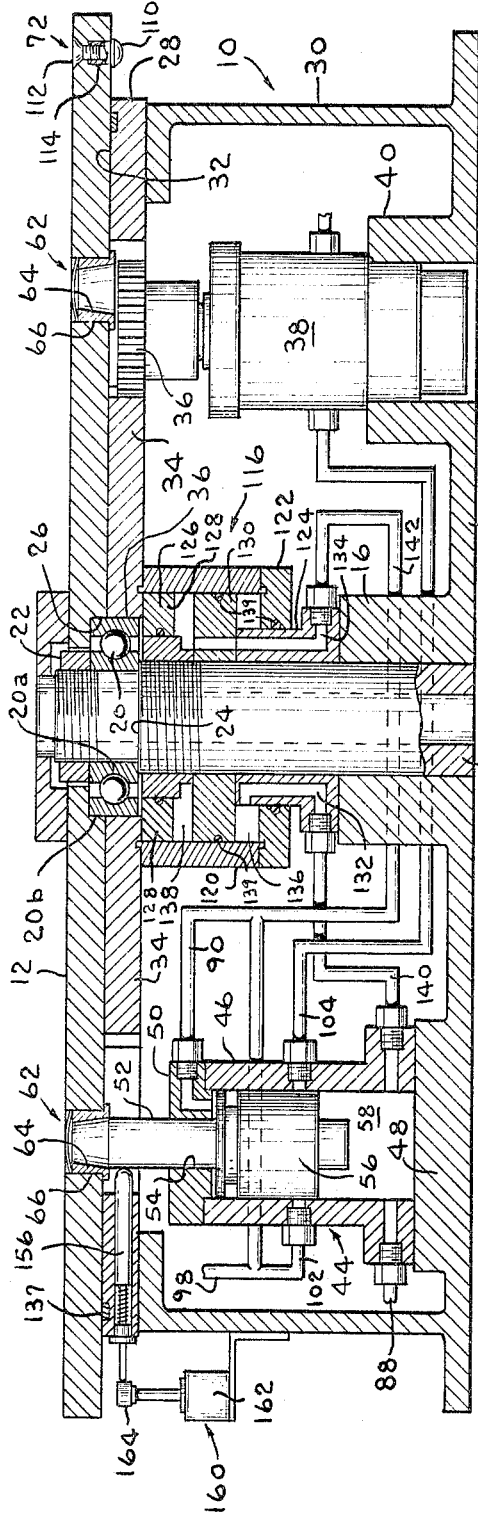
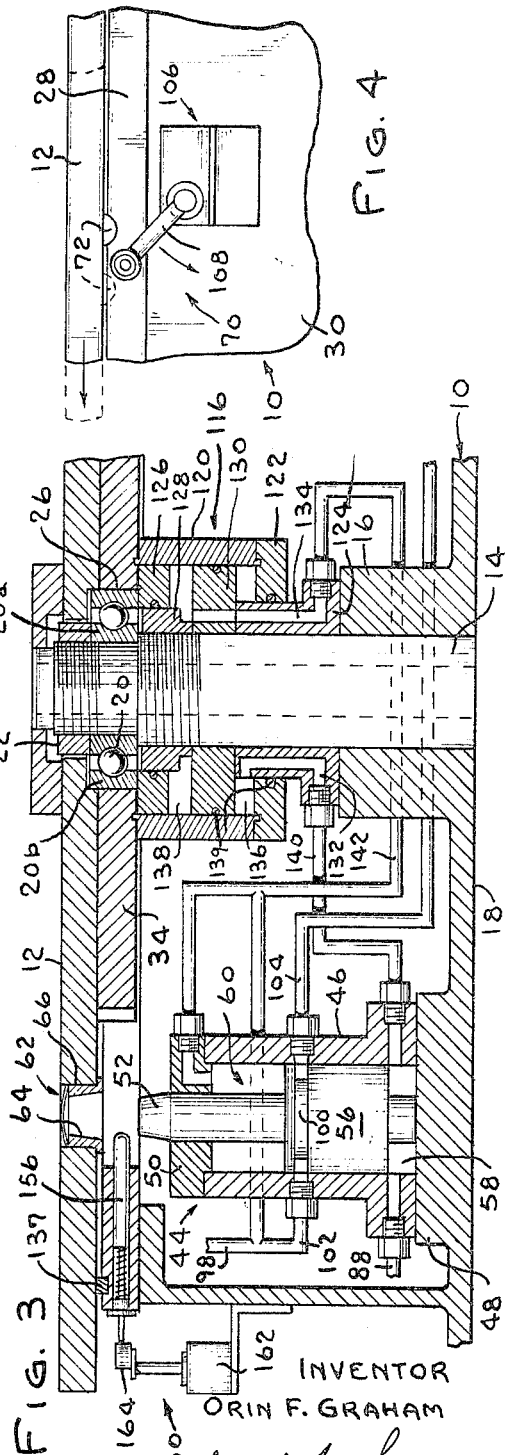
INVENTOR
ORIN F. GRAHAM
BY Joseph A. Geminiani
ATTORNEY

United States Patent Office 3,277,789
Patented Oct. 11, 1966

3,277,789
INDEX TABLE AND INDEXING CONTROL
THEREFOR
Orin F. Graham, 285 Muenter Ave., Fond du Lac, Wis.
Filed Mar. 29, 1965, Ser. No. 443,378
14 Claims. (Cl. 90—56)

This invention relates to indexing tables and indexing controls therefor and, more particularly, to such tables and controls as are adapted for use in a machine tool.

A general object of this invention is to provide an improved and relatively simplified index table.

Another general object of this invention is to provide an improved and relatively simplified indexing control for an index table.

A further object of this invention is to minimize vibration during a machining operation being performed on a workpiece supported on a table top of a machine tool index table.

A still further object of this invention is to increase the load carrying capacity of the table top of an index table.

For the achievement of these and other objects, this invention proposes an arrangement wherein the index drive and indexing control are integrated and utilize the same media of power. Furthermore, this invention contemplates an arrangement which clamps the index table top onto a secure seat during an operational cycle, such as machining, and supports the table top on a pressure bearing during movement thereof to thereby increase its load carrying capacity. To this end the table top is supported for indexing movement in a given path and is associated with a bearing surface in such a manner that relative movement can be effected between the bearing surface and the table in a direction transversely of the path of indexing movement of the table top to selectively clamp the table top on the bearing surface and release it for indexing movement. Again the media of power for effecting this relative movement is preferably the same as that used for the index drive and indexing control, and the control for the mechanism for achieving this relative movement is integrated with the drive and indexing control.

Other objects and advantages will be pointed out in, or be apparent from, the specification and claims, as will obvious modifications of the embodiment shown in the drawings, in which:

FIG. 2 is a sectional view taken generally along line 2—2 of FIG. 1 and illustrating the index table clamped in position for a machining operation;

FIG. 3 is a partial sectional view of the index table taken generally along the same line as FIG. 2 and illustrating the index table in its release position for movement to a particular operational position;

FIG. 4 is a partial view of one of the elements of the indexing control; and

Figure 1:
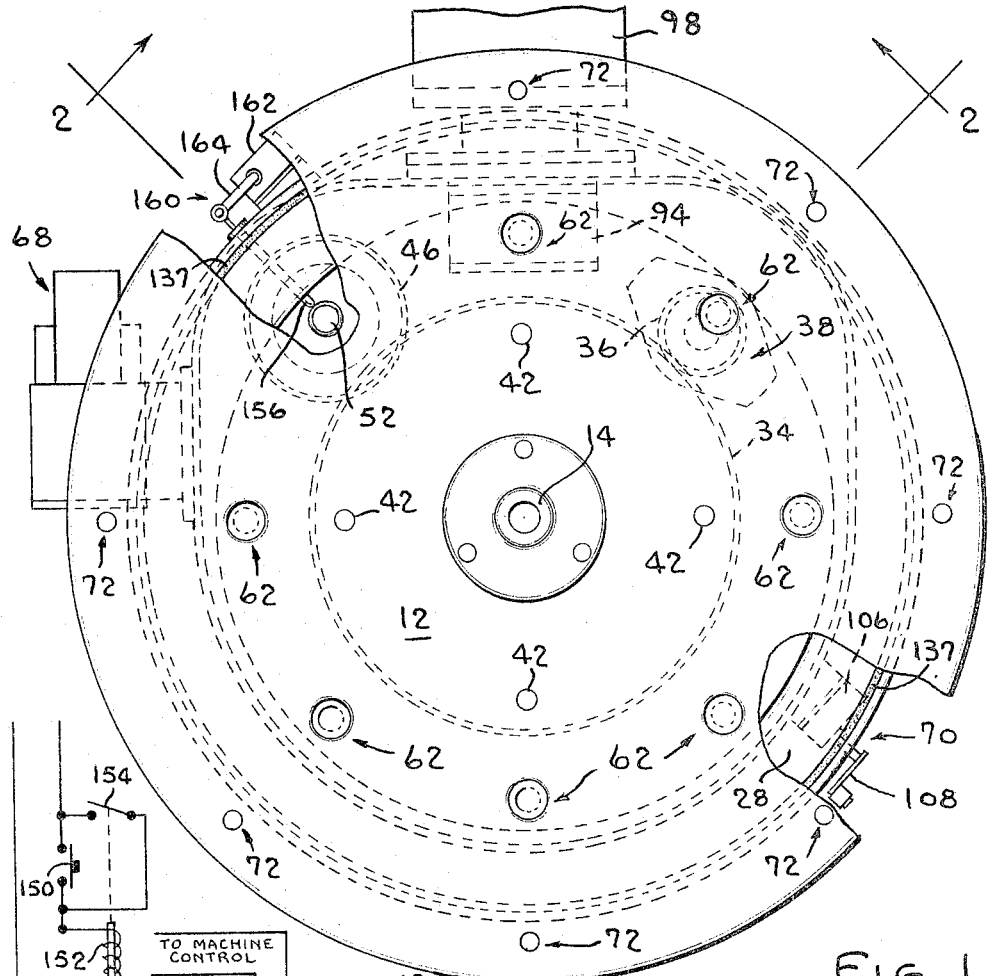
FIG. 1 is a top plan view of a portion of the index table having portions broken away to expose elements of the indexing control.

Although the following description will discuss this invention as embodied in a machine tool of the type for carrying out operations such as drilling, boring, milling and the like, it will be appreciated that this invention has general application to the machine tool field and may find general application beyond that field in areas where indexing and/or supporting of a workpiece or other article are required.

With particular reference to the drawings, an index table is illustrated as including a support frame 10 and a table top 12 supported for rotation with respect to the support frame. It will be appreciated that support frame 10 can comprise the entire integrated support for the table top or it can merely be a portion only of a more complex support arrangement for the index table. Table top 12 is supported for rotation about a center post 14 which is fixed to and extends from hub 16 of a bottom wall 18 of the support frame. A central bearing connection of the table top to the center post is provided through ball bearing 20 which is held in position with respect to the center post by lock nut 22 which clamps the ball bearing in engagement with shoulder 24 and against axial movement with respect to the center post. Inner race 20a of the ball bearing has a suitable tight or pressed fit on center post 14 and outer race 20b thereof has a sliding fit in annular recess 26 of table top 12 for a purpose which will become apparent as this description proceeds.

Ball bearing 20 provides a central rotational support for table top 12 and an outer annular bearing plate 28 is also provided to increase the stability of the table top during rotation thereof. Bearing plate 28 is fixed to frame sidewall 30, which extends continuously around the circumference of support frame 10, and includes a bearing face 32 which extends parallel to the path of rotation of table top 12 and faces toward the underside of the table top.

Ring gear 34 is suitably connected to the underside of table top 12 for rotation therewith and includes an inner circular face 36 defining an opening for receipt of bearing 20 and which has a sliding fit with outer ball bearing race 20b. Ring gear 34 engages drive gear 36 and is connected to and driven by hydraulic motor 38. The hydraulic motor is fixed to boss 40 of bottom wall 18 and is positioned within the enclosure formed by the bottom wall, sidewall 30 and table top 12. With this arrangement, activation of hydraulic motor 38 effects rotation of table top 12 about the axis defined by center post 14.

Index tables of this type are adapted to support a workpiece on the outerface of table top 12 and for this purpose suitable means is generally provided on the outerface of table top 12 for receipt of and attachment of a workpiece to the table top, for example, this may take the form of a plurality of radially and angularly spaced threaded openings 42 as is illustrated in FIG. 1. The index table is generally utilized to support the workpiece so that a machining operation such as milling, drilling, boring, etc. can be performed thereon. A number of articles may be supported on the table top in angular spaced relation for selective machining or a single article may be supported to undergo a number of machining operations but at different points thereon so that it is necessary that the index table be capable of moving the workpiece, or pieces, through a prescribed angular distance at the completion of one machining operation to properly position the workpiece for a successive machining operation. To this end an indexing control is provided which is effective to index the table top through a prescribed number of angularly spaced operational positions.

As was described above, the hydraulic motor is capable of rotating the index table and in order to positively locate the table top at a particular operational position the index table is provided with a shot pin assembly 44 adapted to selectively establish a locking connection between the table top and the frame to prevent table top rotation. The shot pin assembly is supported on bottom wall 18 and structurally includes tubular member 46 extending from boss 48 in the bottom wall and having its free end closed by cap 50. A shot pin 52 extends through an aperture 54 in cap 50 and is connected to a body 56 which is disposed within and is free for movement relative to cylinder 46.

Body 56 acts in the nature of a piston within a cylinder formed by member 46 and shot pin 52 is movable toward and away from table top 12 in response to movement of piston 56 within cylinder 46. Movement of piston 56 is preferably effected through the introduction of a suitable media into chamber 58 on one side of piston 56, which moves the shot pin toward table top 12, and alternatively by introduction of a suitable media into chamber 60 on the opposite side of piston 56 which moves shot pin 52 away from the table top and retracts it into cylinder 46. Since a hydraulic motor is utilized to effect rotation of table top 12, a simplified control arrangement is maintained by also using hydraulic fluid to effect movement of the shot pin into and out of engagement with the table top, however, it will be appreciated that it is conceivable that other means of effecting movement of the shot pin assembly could be utilized.

Table top 12 is provided with a plurality of shot pin receiving means 62 which are angularly spaced about the axis of rotation of the table top and correspond to the various operational positions of the index table as determined by the operational cycle established for the index table. Structurally, each of the shot pin receiving means includes a tapered bushing 64 received in a through hole 66 in the table top and opening at the underside of the table top. The shot pin and the shot pin receiving means are arranged on equal radii with respect to the axis of rotation of the table top so that they can be selectively aligned for movement of the shot pin into a respective one of the shot pin receiving means to positively lock the table top in a given operational position.

The indexing control for the index table also includes a solenoid valve assembly 68, which controls the shot pin assembly, and switch assembly 70 connected to the support frame and cooperable with a plurality of cam means 72, which are fixed to and rotatable with the index table, for controlling energization and de-energization of the solenoid valve. More particularly, the solenoid valve includes an armature 74 associated with a coil 76 and a return spring 78 in a conventional manner. Armature 74 is connected to a piston 80 arranged for movement within cylinder 82. Piston 80 includes two jointly movable valve members 80a and 80b which are associated with and are operative to alternately open and close ports 84 and 86 leading from the interior of cylinder 82 to chambers 58 and 60 of the shot pin assembly through conduits 88 and 90 respectively. An inlet port 92 communicates with the interior of cylinder 82 and is connected to a hydraulic pump 94 through conduit 96. Pump 94 is driven by a suitable motor 98 and inlet 92 is arranged so that it remains open to the interior of cylinder 82 whether valves 80a and 80b are opening or closing outlets 84 and 86 so that the pump maintains a continuous supply of hydraulic fluid to the solenoid valve, or continuous pressure on the hydraulic fluid in the solenoid valve, and through the solenoid valve to shot pin assembly. Thus movement of the shot pin assembly is controlled by the solenoid valve.

At this point it should be noted that in order to maintain the overall simplicity of the indexing control already afforded by the utilization of a common mode of power for both the shot pin and table drive motor, the valve control for hydraulic motor 38 is preferably integrated in the shot pin assembly. More particularly, piston 56 of the shot pin assembly is provided with a continuous circumferential groove 100 which cooperates with outlets 102 and 104 in cylinder 46 to alternately complete and interrupt a passage for hydraulic fluid from the pump and solenoid valve to hydraulic motor 38. Groove 100 is arranged on piston 56 so that when the shot pin is extended and engaged with the table top the hydraulic passage to the hydraulic motor is interrupted so that the hydraulic motor is de-activated when the table top is locked against rotation and the motor is not required. However, when the shot pin is retracted to release the table top for rotation groove 100 registers between conduits 102 and 104 and connects the hydraulic motor to a supply of hydraulic fluid to thereby initiate rotation of the table top.

Returning now to a discussion of the index control for positioning the index table at a particular operational position, switch assembly 70 includes a switch 106 connected in the energization circuit of the solenoid valve and an operator arm 108 for operating the switch. Cam means 72 each comprise a screw 112 threaded into a bushing 110 having an external head and being received in an opening 114 in the table top. The heads of screws 110 are positioned on equal radii and operator arm 108 is positioned in the path of rotation of the screw heads so that the screw heads act in the nature of cams to engage and pivot operator arm 108 to actuate switch 106.

Switch 106 is of the normally closed variety so that when the energizing circuit for the index table is completed, in a manner to be described more completely hereinafter, a circuit is established to coil 76 of the solenoid valve. This activates the coil and moves armature 74 to the position illustrated in FIG. 5 wherein valve 80a closes outlet 84 and outlet 86 is open thereby admitting hydraulic fluid to chamber 60 and maintaining pressure on the fluid in the chamber to retract the shot pin and release the table top for rotation. The retracted shot pin completes a hydraulic circuit to motor 38 to rotate the table top. The table top continues to rotate until one of the cam means 72 engages operator arm 108 whereupon switch 106 is opened and the electrical circuit to the solenoid coil is interrupted releasing the armature for movement by spring 78. Spring 78 moves valve 80a out of registry with outlet 84 and valve 80b into registry with outlet 86 thereby opening conduit 88 to flow of fluid while closing conduit 90. This introduces hydraulic fluid to chamber 58 of the shot pin assembly moving the shot pin toward the table top and into engagement with a shot pin receiving means 62 corresponding to the particular operational position desired. Movement of the shot pin into its locking position with the table top also interrupts the flow of hydraulic fluid to the hydraulic motor to thereby bring the index table to rest at a particular operational position. It will be appreciated that a slight time delay occurs between the movement of the operating arm 108 to actuate the switch and the actual stopping of the index table thereby allowing the cam means to coast past the operating arm to clear the operating arm and allow switch 106 to re-establish a closed circuit condition so that the control mechanism is re-established for a subsequent move of the table top to a succeeding operational position. This re-establishment of the electrical control circuit is also insured by the relative positioning of the shot pin receiving means and cam means 72.

A further feature of the index table constructed in accordance with this invention is an arrangement whereby the table top is supported to permit an optimum load to be carried thereby and, moreover, whereby vibration of the table top during the particular machining operation is eliminated, or reduced to a minimum, to thereby improve the accuracy with which the machining operation is performed.

More particularly, a lift and clamp assembly 116 is associated with center post 14 and the rotatable support for table top 12. Again, since the various control elements of the index table discussed to this point are hydraulically operated, the clamp and lift assembly is also hydraulically operated, however, it will be obvious from the following description that other operating media could also be used if desired.

Structurally, the clamp and lift assembly includes a hollow member 120 connected to the underside of ring gear 34 and having its opposite end connected to an annular member 122 which, in cooperation with a hub 124 and center post 14, closes one end of member 120.

Figure 5:
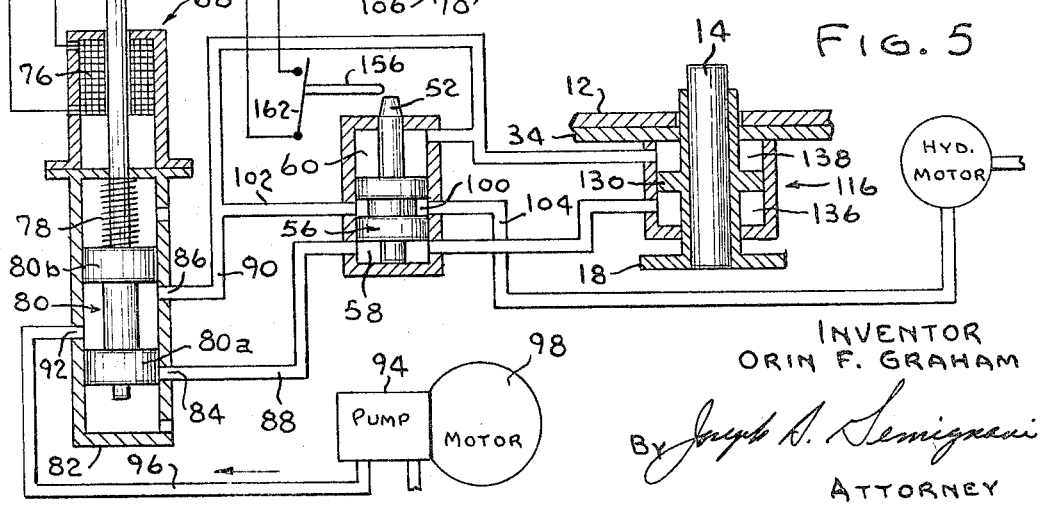
FIG. 5 is a schematic view of the hydraulic circuit for the indexing control.

The opposite end of member 120 is closed by a second annular member 126 disposed between cylindrical member 120 and a lock nut 128 threaded on center post 14. The center post, lock nut and annular member 126 cooperate to close the opposite end of member 120. An annular member 130 is clamped between the upper end of hub 124 and lock nut 128 and is thereby held against axial movement with respect to center post 14. However, annular members 122 and 126 and cylinder 120 are interconnected and have a sliding fit with hub 124, lock nut 128 and piston 130, respectively, so that these members are movable axially with respect to center post 14 and annular member 130. The assembly provided by annular members 122, 126 and cylindrical member 120 acts in the nature of a cylinder and is connected to ring gear 34 which is in turn connected to table top 12. Since the table top and gear have a sliding fit with outer race 20b of the ball bearing, the table top and ring gear are also movable in an axial direction with respect to the center post in response to movement of the cylinder. With this arrangement axial movement of the table top and the ring gear moves the table top toward and away from bearing surface 32 of bearing plate 28 since the latter is fixed to support frame 10. To effect this axial movement annular member 130 acts as a fixed piston and, as can be seen in FIGS. 2 and 5, passages 132 and 134, a portion of passage 134 extending through piston 130, communicate with a clamp chamber 136 and a lift chamber 138, respectively, disposed on opposite sides of the fixed piston. Introduction of hydraulic fluid into chamber 136 moves the cylinder downwardly with respect to piston 130 and correspondingly moves table top 12 into engagement with bearing face 32. Pressure is maintained on the fluid in chamber 138 to thereby securely clamp the table top onto the bearing face and provide a stable seat for the workpiece to minimize, if not completely eliminate, vibration during the particular machining operation. Alternatively, hydraulic fluid admitted into chamber 138 causes cylinder 118 to rise lifting table top 12 from bearing face 32 to thereby free the table top for rotation and also supporting the table top on a high pressure fluid bearing to thereby increase the load which the table top may carry. The clamped position of the table top and bearing is illustrated in FIG. 2 and the release position is illustrated in FIG. 3 with the clearance opening between the table top and the bearing face being exaggerated for purposes of illustration. It is desirable that in the lift position a low clearance be maintained between the bearing face and the table top so that the bearing face can afford stability for the table top even during rotation. A clearance of .005 inch has provided satisfactory results. This particularly low clearance in the lift position is also desirable since it maintains the enclosure defined by the frame and table top sealed and the enclosure can then serve as a reservoir for the hydraulic fluid to further contribute to the compactness and simplicity of the index table. A sealing gasket 137 is provided at the bearing face to prevent leakage and with the low clearance provided the index table can be used in either a horizontal or vertical position.

It will also be noted that seals 139 are provided at the moving faces between the cylinder and the fixed pieces of the piston, lock nut 128 and hub 124 to prevent leakage of hydraulic fluid so that adequate pressure can be maintained on the hydraulic fluid in chambers 136 and 138 for effective lifting and clamping.

The clamp and lift assembly is also coordinated with the remainder of the indexing control. More particularly, passage 132 communicates with chamber 58 of the shot pin assembly through conduit 140 and passage 134 communicates with conduit 88 through conduit 142. Therefore, when the shot pin is moved into engagement with the table top to hold the table top against rotation and cut off flow of hydraulic fluid to the hydraulic motor, hydraulic fluid is simultaneously introduced to clamp chamber 136 to effect the clamping action between table top 12 and bearing surface 32. Alternatively, when the solenoid valve is operated to retract the shot pin to release the table top for rotation and activate the hydraulic motor the pressure on the hydraulic fluid in clamp chamber 136 is interrupted and hydraulic fluid is introduced into lift chamber 138 to move the table top away from bearing surface 32 and support the table top for rotation to a successive station. Again during rotation pressure is maintained on the fluid in chamber 138 to provide a pressure bearing for the table top.

Initial activation of the index control can be accomplished through switch 150. Switch 150 can be of the momentary closed type and any suitable arrangement can be utilized to maintain an electric circuit through the solenoid coil 76 during rotation of the table top. For example a relay including coil 152 and switch 154 can be utilized to provide a holding circuit which maintains energization of the solenoid coil until switch 106 is open to de-energize the solenoid coil. Opening switch 106 also opens the holding circuit by de-energizing relay 152 to prevent premature re-activation of the hydraulic motor, as the cam means 72 coasts past operator arm 108 to re-establish the solenoid valve circuit, before the particular machining operation can be accomplished. Where a single operation is being effected switch 150 can be of the momentary manually operated type or if a number of automatic operations are being controlled switch 150 can be controlled by a suitable timer (not shown) which controls the duration of a particular machining operation and then closes switch 150 to move the table top to a successive position for another operation. Even in the latter instance switch 150 can be manually operated if desired.

A further feature of this invention is the provision of an additional control arrangement 160 which includes an electrical switch 162 supported from frame 10 and a switch operating arm 164. Operating arm 164 is associated with a spring loaded plunger 156 which is positioned in the path of movement of shot pin 52 so that the plunger is engaged and moved against operator arm 164 as the shot pin moves into engagement with the table top. With this arrangement switch 162 can be utilized to activate the particular machining apparatus or to activate a timer which in turn controls the machining apparatus. Thus, the machining operation is automatically initiated as the shot pin moves into and locks the table top against rotation.

To summarize the operation of the index table and its indexing control, movement of the index table to the first operational station is initiated by closure of the switch 150. This activates coil 152 to close switch 154 and maintain a holding circuit to the solenoid coil 76, at this point it will be appreciated that the holding circuit could be eliminated and momentary switch 150 operated through a timer arrangement, however, the holding circuit arrangement is preferred as it completely integrates the indexing control on the basis of index table movement. Energization of the solenoid coil positions the armature such that outlet 84 is closed and outlet 86 is open thereby retracting and holding the shot pin in its down position to release the table top for rotation and simultaneously activate hydraulic motor 38. Furthermore, with the solenoid valve so positioned pressure of the hydraulic fluid on clamp chamber 136 is removed and hydraulic fluid is introduced into lift chamber 138 to move the table top from bearing surface 32 and support the table top on a fluid pressure bearing for movement to a first operational position. As the table top approaches the first operational position the cam means 72 corresponding thereto engages operator arm 108 to open the circuit through switch 106 and de-energize both solenoid coil 76 and holding coil 152. This de-energizes the solenoid valve and disables the electrical control circuit for the index control by opening switch 154. Spring 78 moves valve 80b to close outlet 86 and valve 80a to open port 84 thereby terminating the pressure on shot pin chamber 60 and introducing hydraulic fluid to chamber 58 to move the shot pin toward table top 12 and engage the shot pin in a corresponding shot pin receiving means 62. This movement of the shot pin also interrupts flow of fluid through conduits 102 and 104 to hydraulic motor 38 to bring the table top to rest and introduces hydraulic fluid into clamp chamber 136 while removing the pressure of the hydraulic fluid from lift chamber 138. This clamps the table top against bearing surface 32 to provide a stable, vibrationless seat for the workpiece during the machining operation, the machining operation having been initiated by closure of switch 160 by the shot pin as it moves into engagement with the table top. Upon completion of the particular machining operation, switch 150 is again operated, either manually or through a suitable timer, and the shot pin is moved to its retracted position re-activating hydraulic motor 38, and again applying fluid pressure to lift chamber 138 to thereby release and support the table top for movement to the next operational position. The above sequence of control operations can be repeated as often as necessary to complete a desired number of operations on the workpiece.

Although but one embodiment of the present invention has been illustrated and described, it will be apparent to those skilled in the art that various changes and modifications may be made therein without departing from the spirit of the invention or from the scope of the appended claims.

I claim:
1. Apparatus of the type described comprising, in combination,
   a workpiece carrying member,
   a support frame for said workpiece carrying member,
   means connecting said workpiece carrying member to said frame for movement relative to said frame in a given path,
   means defining a bearing surface extending generally parallel to said path and facing said workpiece carrying member,
   lock means,
   means operatively connecting said lock means for movement between said workpiece carrying member and said frame to alternatively assume a first position providing a lock connection between said workpiece carrying member and said frame to hold said workpiece carrying member against movement relative to said frame and a second position releasing said workpiece carrying member for movement along said path,
   control means for said lock means including an operating portion disposed in said path and operative when actuated to effect movement of said lock means to said first and second positions,
   drive means for moving said workpiece carrying member along said path,
   said lock means including means connected to and operative to activate said drive means when said lock means assumes said second position and to de-activate said drive means when said lock means assumes said first position,
   a plurality of means each corresponding to a preselected position of said workpiece carrying member and connected to and movable with said workpiece carrying member and arranged for selective engagement with said operating portion of said control means to actuate said control means,
   clamp and lift means operatively connected between said workpiece carrying member and said bearing surface and operative to effect relative movement between said workpiece carrying member and said surface in a direction transverse to said path of movement to move said workpiece carrying member and said bearing surface toward and away from each other,
   and means connecting said clamp and lift means to and for response to activation of said lock means to effect said relative movement between said bearing surface and workpiece carrying members in a direction away from each other when said lock means assumes said second position and in a direction toward each other to clamp said bearing surface and said workpiece carrying member together as said lock means assumes its first position.

2. The combination of claim 1 including additional control means operatively arranged with said lock means to be activated by said lock means as said lock means moves to said first position so that said additional control means can be used to initiate an operational cycle on a workpiece carried by said workpiece carrying member.

3. In a machine tool the combination comprising, in combination,
   a table,
   a support frame for said table,
   means connecting said table to said frame for indexing movement relative to said frame in a given path,
   drive means connected to and operative to drive said table in said path,
   shot pin means,
   means operatively connecting said shot pin means for movement between said table and frame to alternatively assume a first position providing a locking connection between said table and frame to hold said table against movement relative to said frame and a second position interrupting said connection to release said table for movement along said path,
   first control means for said shot pin means including an operating portion disposed in said path and operative to effect movement of said shot pin means to said first and second positions,
   said shot pin means including means connected to and operative to activate said drive means when said shot pin means assumes said second position and to de-activate said drive means when said shot pin means assumes said first position,
   means defining a bearing surface on said frame fixed relative to said table, said bearing surface extending generally parallel to said path of movement and facing toward said table for selective clamping engagement therewith,
   clamp and lift means operatively connected between said table and said bearing surface and operative to move said table relative to said bearing surface in a direction transversely of said path of movement to move said table toward and away from said bearing surface,
   means connecting said clamp and lift means to said shot pin means and for operation of said clamp and lift means in response to movement of said shot pin means between said first and second position to alternatively move said table away from said bearing surface and toward said bearing surface for clamping engagement therewith as said shot pin means assumes its second and first positions, respectively,
   a plurality of cam means each corresponding to a preselected position of said table connected to and movable with said table and arranged for selective engagement with said operating portion of said control means to activate said control means to move said shot pin means to said second position.

4. The combination of claim 3 wherein said table and said bearing surface are characterized by having a low clearance therebetween when said table has been moved away from said bearing surface so that said bearing surface provides stability for said table during rotation thereof.

5. The combination of claim 3 wherein said first control means for said shot pin means is electrically energizable and wherein the energizing circuit therefor includes a normally closed electrical switch connected for actuation by said operating portion to change the state of operation of said first control means,
 a normally open start switch in series circuit relationship with said normally closed electrical switch,
 and relay means including a coil in series circuit relationship with said normally closed switch and said start switch and a holding switch in parallel circuit relationship with said start switch whereby the control of indexing movement of said table is integrated on the basis of table rotation.

6. The combination of claim 5 wherein a time delay occurs between opening of said normally closed switch and stopping of said table sufficient to clear said cam means from said control means operating portion to reestablish the electrical energizing circuit for said first control means which can be completed for a subsequent indexing step upon closure of the start switch,
 and wherein the point of engagement of said shot pin means is arranged with respect to said cam means to hold said control means operating portion clear of said cam means.

7. The combination of claim 3 wherein said clamp and lift means comprises a hydraulically operated mechanism including a piston connected to one of said bearing surface and said table and means defining a cylinder for said piston and connected to the other of said bearing surface and said table,
 and including means for selectively admitting hydraulic fluid to opposite sides of said piston to alternatively move said table and bearing surfaces toward and away from each other so that when said table is moved away from said bearing surface said hydraulic fluid provides a fluid bearing support for said table.

8. In a machine tool, the combination of
 a table,
 a frame,
 means supporting said table for indexing movement relative to said frame in a given path,
 a hydraulic motor connected to and operative to drive said table,
 a shot pin assembly supported on said frame, said shot pin assembly including a shot pin, means supporting said shot pin for movement toward and away from said table and a hydraulic cylinder and piston arrangement connected with said shot pin for effecting movement thereof relative to said table,
 a plurality of means on said table facing toward said shot pin assembly for receiving said shot pin and each corresponding to an operational position of said table to receive said shot pin and hold said table against indexing movement and in an operational position,
 first control means for admitting hydraulic fluid to opposite sides of said shot pin assembly piston to selectively effect said shot pin movement,
 said shot pin assembly also including valve means for controlling the flow of hydraulic fluid to said hydraulic motor and operative to interrupt flow of fluid to said hydraulic motor when said shot pin moves toward and engages said table and to establish flow to said hydraulic motor when said shot pin moves away from and releases said table,
 second control means for activating said first control means at a preselected index position to stop said table at said positions,
 a fixed bearing surface extending generally parallel to said path of indexing movement and facing toward said table for selective clamping engagement with said table,
 hydraulically operated lift and clamp means operatively connected between said bearing surface and said table and including a piston connected to one of said table and said bearing surface and a cylinder connected to the other of said piston and bearing surfaces and supporting said table for movement transversely of said path of indexing movement and toward and away from said bearing surface,
 and means connecting said hydraulic lift and clamp means to said shot pin assembly and operative to introduce hydraulic fluid to one side of said lift and clamp means piston to move said table away from said bearing surface when said shot pin is moved away from said table to thereby release and support said table for rotation and alternatively to introduce hydraulic fluid to the opposite side of said lift and clamp means piston when said shot pin is moved into engagement with said table to move said bearing surface and table into clamping engagement to hold said table against rotation.

9. The combination of claim 8 wherein said table and bearing surface are characterized by having a low clearance therebetween when said table has been moved away from said bearing surface.

10. The combination of claim 8 including additional control means including an operating portion disposed in the path of movement of said shot pin for engagement thereby as said shot pin moves toward said table so that said additional control means can be utilized to initiate an operational cycle on a workpiece carried by said table.

11. The combination of claim 8 wherein said hydraulic motor, said shot pin assembly and said lift and clamp means are connected in a common hydraulic circuit,
 and wherein said first control means includes valve means for alternatively directing hydraulic fluid to opposite sides of said shot pin piston and said lift and clamp means piston.

12. Apparatus of the type described comprising, in combination,
 a workpiece carrying member,
 a support frame for said workpiece carrying member,
 means connecting said workpiece carrying member to said frame for movement relative to said frame in a given path,
 drive means connected to and operative to drive said carrying member in said path,
 lock means,
 means operatively connecting said lock means between said workpiece carrying member and said support frame and supporting said lock means for movement between a first position locking said workpiece carrying member against movement relative to said frame and a second position releasing said workpiece carrying member for movement along said path,
 control means for said lock means including an operating portion disposed in said path and operative to effect movement of said lock means to said first and second positions,
 said lock means including means connected to and operative to activate said drive means when said lock means assumes said second position and to de-activate said drive means when said lock means assumes said first position,
 a plurality of means each corresponding to a preselected position of said workpiece carrying member and connected to and movable with said workpiece carrying member and arranged for selective engagement with said operating portion of said control means to activate said control means to move said lock means to said second position,
 and additional control means operatively arranged with an operating portion thereof disposed in the path of movement of said lock means to be actuated by said lock means as it moves to said first position so that said additional control means can be used to initiate an operational cycle on a workpiece carried by said workpiece carrying member.

13. In a machine tool, the combination comprising,
 a table,
 a support frame for said table, means connecting said table to said frame for indexing movement relative to said frame in a given path, drive means connected to and operative to drive said table in said path, shot pin means, means operatively connecting said shot pin means for movement between said table and said frame to alternatively assume a first position providing a locking connection between said table and said frame to hold said table against movement relative to said frame and a second position interrupting said connection to release said table for movement along said path, control means for said shot pin means including an operating portion disposed in said path and operative when actuated to effect movement of said shot pin means to said first and second positions, said shot pin means including means connected to and operative to activate said drive means when said shot pin means assumes said second position and to de-activate said drive means when said shot pin means assumes said first position, a plurality of means each corresponding to a preselected position of said table and connected to and movable with said table and arranged for selective engagement with said operating portion of said control means to activate said control means to move said shot pin means to said second position, and additional control means operatively arranged with said shot pin means to be activated by said shot pin means as it moves to said first position so that said additional control means can be used to initiate an operational cycle on a workpiece carried by said table.

14. The combination of claim 13 wherein said drive means comprises a hydraulic motor, said frame includes means defining a reservoir for containing hydraulic fluid for said hydraulic motor and said hydraulic motor is disposed in said reservoir, said means for activating and de-activating said drive means comprises a valve member movable with said shot pin means, and including means defining a hydraulic fluid path to said hydraulic motor with said shot pin valve means operatively connected in and movable with respect to said hydraulic fluid path to interrupt the flow of fluid to said hydraulic motor when said shot pin means assumes said first position and to complete a hydraulic circuit to said hydraulic motor when said shot pin means assumes said second position.

References Cited by the Examiner

UNITED STATES PATENTS 2,934,978   5/1960   Estabrook _____ 90—58 X

WILLIAM W. DYER, Jr., *Primary Examiner.*

G. A. DOST, *Assistant Examiner.*